Dec. 28, 1965    M. E. DRAPEN ETAL    3,225,759
DENTAL CLEANING AND MASSAGING DEVICE
Filed May 31, 1963
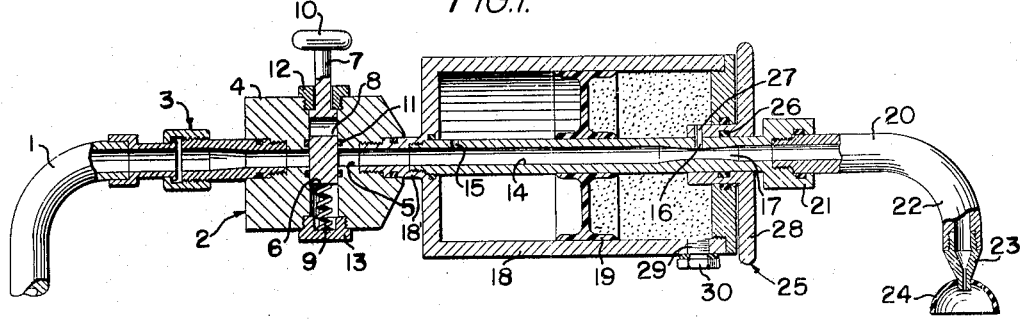
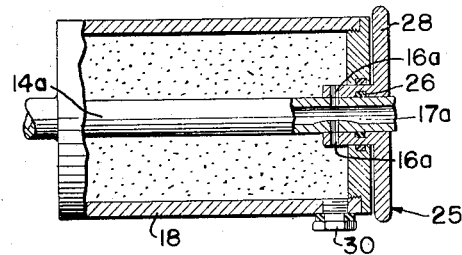
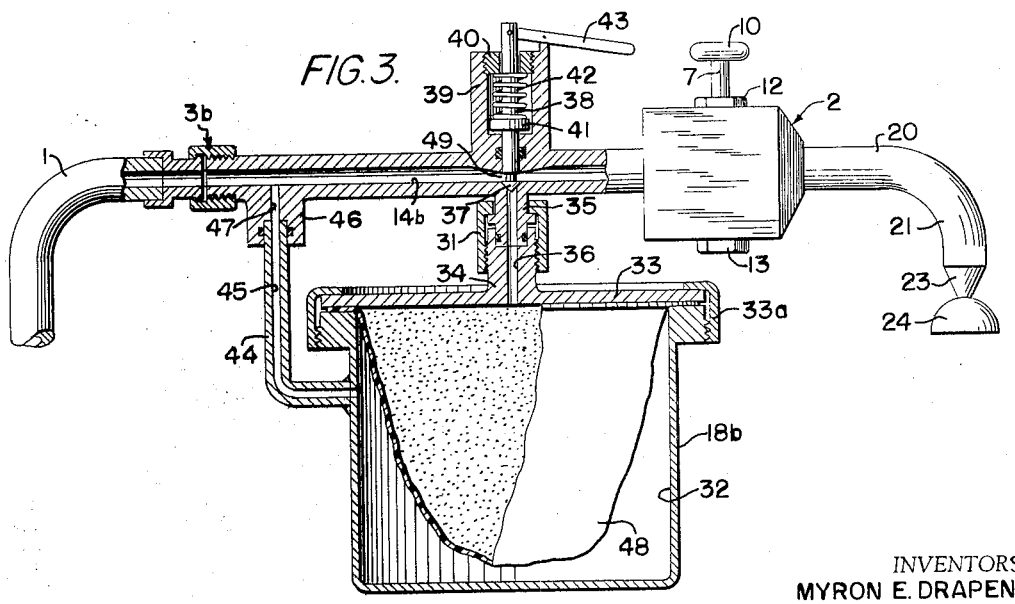
INVENTORS.
MYRON E. DRAPEN
ARNOLD E. SEIGEL
BY
ATTORNEY

United States Patent Office 3,225,759
Patented Dec. 28, 1965

3,225,759
DENTAL CLEANING AND MASSAGING DEVICE
Myron E. Drapen, 3538 Woodbine St., and Arnold E. Seigel, 3302 Pauline Drive, both of Chevy Chase, Md.
Filed May 31, 1963, Ser. No. 284,480
4 Claims. (Cl. 128—66)

This invention relates to dental hygiene. More particularly this invention relates to a process and a device for treating the oral cavity, especially the teeth and gums.

Heretofore, in the practice of dental hygiene in the home, the only practical device that has been used for cleaning the teeth is the toothbrush. The toothbrush has also been used generally for massaging the gums.

It is recognized by the dental profession that the toothbrush is a very unsatisfactory device for cleaning teeth and massaging the gums, but no other practical device is known for practicing dental hygiene in the home. The toothbrush is incapable, as ordinarily used, to dislodge food particles which are lodged between the teeth. In order to dislodge such food particles resort must be had to the toothpick or to dental floss. The use of the toothpick or dental floss is troublesome, and the ordinary person is reluctant to use either device in addition to the toothbrush. The result is that the ordinary person uses only the toothbrush, and this gives him a false sense of cleanliness when, as a matter of fact, the food particles lodged between the teeth remain and decay there causing bad breath and tooth decay.

The toothbrush is also unsanitary. Any disease germs present in the mouth may lodge on or between the bristles of the brush and when again used tend to reinfect the mouth with the germs. In some persons, a stiff toothbrush causes injury and bleeding of the gums. The toothbrush also tends to cause erosion of the enamel of the teeth.

It is also well known in the dental profession that the gums, in order to keep them healthy, must be massaged daily. The toothbrush is a very unsatisfactory device for massaging gums, and some dentists recommend the use of a finger for this purpose. However, this also is bothersome and unsatisfactory, and the ordinary person neglects to massage his gums, which may result in their becoming soft and diseased. When this happens, medicament must be applied to the gums, and at times the application of medicament to the gums must be done in the home. The toothbrush cannot be used for this purpose.

It is accordingly an object of this invention to provide a dental hygiene device which does not have the defects of the toothbrush enumerated above.

It is a further object of this invention to provide a simple device for cleaning the teeth and massaging or otherwise treating the gums and oral cavity.

It is a still further object of this invention to provide an improved method of practicing oral hygiene in the home.

Another object of this invention is to provide a device capable of delivering a solid stream of liquid to the teeth, gums, and other areas of the oral cavity under a pressure and at a velocity sufficient to dislodge any food particles which may be present in the mouth and which are lodged between the teeth and sufficient to cause a massaging of the gums.

Still another object of this invention is to provide a dental device which may be used to apply a liquid medicament to the gums or other parts of the oral cavity, which device can be operated in the home by the ordinary unskilled person.

Other objects and advantages of this invention will readily become apparent to those skilled in the art from the detailed description thereof given below when taken with the accompanying drawing.

In the drawing:

FIG. 1 is a longitudinal section partly in elevation of one form of the novel device made according to this invention.

FIG. 2 is a longitudinal section through a modified form of material holder and feeder.

FIG. 3 is a view similar to FIG. 1, showing another form which the novel device may take.

Referring to FIG. 1, reference character 1 designates a flexible tube or hose of rubber or other suitable plastic material, one end of which can be attached to an ordinary household faucet or to a pipe leading to a source of water pressure. The other end of the hose is attached to a valve 2 by means of coupling 3, or by any other suitable means.

The valve 2 comprises a casing 4 having a bore 5 extending therethrough. Another bore 6 extends through the casing 4 at substantially right angles to and intersecting the bore 5. A movable stem 7 having an opening 8 extending therethrough is positioned in the bore 6. The opening 8 is positioned in the stem 7 so that upon movement of the stem, the opening 8 may be brought into registration with the bore 5 to permit fluid to flow through the bore 5 and opening 8 from one end of the casing to the other. The opening 8 is normally kept out of registration with the bore 5 by a spring 9 which acts on the stem 7 to move the stem to a position where opening 8 and bore 5 are not in register, thereby preventing the flow of fluid through the valve. One end of the stem 7 extends to the outside of the casing and is provided with a head 10 which may be pressed by the finger or palm of the hand to counteract the force of the spring 9 and move the opening 8 into registration with the bore 5 to permit fluid to flow through the bore. The valve is also provided with packings 11 to prevent leakage of fluid. Bushing 12 serves as a guide and stop for stem 7, and plug 13 serves as a closure for bore 6 and an adjustable support for spring 9. A pipe or tube 14 is positioned in alignment with bore 5. The bore of tube 14 forms a continuation of bore 5 so that fluid may flow from hose 1 through bore 5 to and through tube 14. Tube 14 is provided with a hole or holes 15 adjacent to one end and with a hole or holes 16 adjacent to the other end thereof. The bore of tube 14 adjacent to the end thereof remote from valve 2 is provided with a constriction 17 to form a venturi. The hole or holes 16 communicate directly with the constricted portion 17.

Surrounding the tube 14 is a container 18 adapted to hold a flowable material such as a liquid or a soluble powdered material suitable for use in cleaning the teeth and/or treating the gums or other parts of the oral cavity. The end of the container adjacent to the valve 2 is provided with hollow extension 18' which is threaded into bore 5 and tube 14 is threaded into extension 18', thereby forming a rigid connection between valve 2, container 18, and tube 14, and a continuous passage from bore 5 to and through the bore of pipe 14. A piston 19 is slidably mounted on tube 14 within the container for sliding movement between holes 15 and 16. Another pipe or tube 20 is detachably secured to the end of tube 14 remote from valve 2 by means of coupling 21. Tube 20 has its free end curved as at 22. A nozzle 23 is detachably secured, as by screw threads to the free end of tube 20. A cup 24 is mounted on the nozzle 23 and extends therebeyond. The cup is formed of rubber or other resilient plastic, such as nylon, polyethylene or the like.

The flow of material from container 18 into tube 14 through hole or holes 16 may be controlled by a rotatable sleeve valve 25. Valve 25 comprises a sleeve 26 mounted for rotation on tube 14. Sleeve 26 has one or more openings 27 adapted to be brought in complete or partial registration with hole or holes 16 in tube 14 upon rotation of the sleeve. The sleeve extends through the end of container 18 nearest the opening 16 and is provided on the outside of the container with an operating member such as a disc 28 integral with the sleeve and of slightly larger diameter than the diameter of the container so that the sleeve 26 may be rotated by means of the disc to bring openings 27 into complete or partial registration with hole 16. Sleeve 26 may also be rotated so as to completely close hole or holes 16 to cut off the flow of material from container 18 into tube 14.

A filling opening 29 is provided in container 18 through which the desired material may be introduced into the container. Filling opening 29 is normally closed by plug 30.

In operation, the hose 1 is attached to an ordinary house faucet or other source of water under pressure and water flows through the hose to the valve. When it is desired to clean the teeth, the cup 24 and nozzle 23 are inserted into the mouth and the cup contacted with the teeth and gums. The stem 7 is then depressed until the passageway 8 is in full or partial registration with the bore 5. The water flows through bore 5 and tubes 14 and 20 and through the nozzel 23 against the teeth and gums with sufficient velocity to dislodge any food particles which may be present on and between the teeth. During the flow of water the nozzle and cup are moved back and forth across the teeth thereby cleaning the teeth. The cup has continuous walls and prevents splashing of the water which strikes the teeth, and the movement of the cup in contact with the teeth aids in the polishing of the teeth and in the massaging of the gums.

A portion of the water flowing through tube 14 passes out of opening 15 to build up pressure in container 18 on one side of the piston 19 to cause a movement of the piston toward the other end of the container to force the material placed in the container on the other side of piston 19 out through opening 16 into the constricted portion of tube 14 where it is entrained and mixed with the main stream of water flowing through tube 14, and the mixture flows through tube 20 and nozzle 23 into the oral cavity.

The bend 22 in tube 20 aids in the proper insertion of the nozzle and cup into the oral cavity and thus renders the stream issuing from the nozzle fully effective for the purpose indicated.

The nozzle is designed so that a solid jet of liquid issues therefrom rather than a spray, since if the liquid issuing from the nozzle was in the form of a spray it would have insufficient force to cause dislodgement of the food particles and the massaging of the gums.

The velocity of the stream issuing from the nozzle is more or less critical. The velocity of the stream, of course, is dependent upon the pressure in the pipes or tubes and the size of the opening in the nozzle.

We have found that the force necessary to dislodge a particle of food from between or on the teeth may be expressed by the mathematical formula $$F = kqu^2A$$

where F is the force acting on the particle in the direction of the jet, $k$ is a constant depending on the particular geometry involved whose value lies between ½ and 1, $u$ is the velocity of the jet, $q$ is the density of the liquid in the jet, and A is that part of the cross-sectional area of the jet which impinges on the particle of food.

We have also found that the velocity of a jet of liquid capable of dislodging particles from the teeth may vary, but it cannot be too small or too great. If the velocity is too small, it will not dislodge the particle, and if too great it will cause discomfort to the user and injury to the gums. The maximum velocity that can be used will vary with the individual since certain individuals can tolerate a greater force acting on their teeth or gums than others.

In most cities the pressure of the water supplied to the home is approximately 50 to 60 p.s.i. The pressure at the nozzle 23 can be controlled by valve 2. The lower limit of the opening in the nozzle 23 is about 1/64th of an inch in diameter and the upper limit is about 3/32nd of an inch in diameter. The openings need not be circular but may be of other shapes such as elliptical or in the form of a slit so long as the area of the opening approximates that of the limits given above. The velocity of the stream should be between 25 and 100 feet per second, preferably 50–75 feet per second. By controlling the pressure of the water at the nozzle by means of valve 2, the user may adjust the velocity of the stream to exert a force on the teeth and gums to accomplish the dislodgement of the particles and the massaging of the gums without discomfort and without injury to the gums.

The tube or pipe 20 together with the nozzle 23 and cup 24 are easily detachable as a unit from tube 14 so that each member of the family or other person may, for hygienic reasons, be provided with an individual unit to be used with the remainder of the device. If a cup 24 is used the nozzle 13 may be made of metal or plastic. If, however, the cup is omitted, the nozzle 23 must be made of rubber or other plastic to avoid injury to the gums or teeth when the nozzle comes in contact with the gums or teeth. The nozzle 23 and cup 24 are also removable from pipe 20 so, if desired, these may be replaced without replacing tube 20.

The entire device, with the exception of hose 1 and cup 24, is made of light, rigid material. This material is preferably metal which will not rust, such as aluminum, copper, brass, stainless steel and the like. Plastic material, if sufficiently rigid to withstand handling and the pressure of the water without bending or deformation, may also be used. Both the external and internal diameter of tubing 14 and 20 may vary within certain limits so long as they are of sufficient size to deliver the liquid at a rate to produce a stream having a velocity sufficient for the purpose indicated. For example, tubing of from ⅛th to ¼ inch in diameter may be used. The container may be of a size to hold material for one or more applications and may be of any convenient size and shape.

The amount of material introduced into the tube 14 from the container 18 is controlled by sleeve valve 25, and the amount may vary within wide limits depending on the type of the material introduced.

Any suitable dentifrice material or medicament may be placed in container 18, provided it is in a flowable condition, such as a liquid, or a powder which is readily soluble in the liquid flowing through tubes 14 and 20, so that it is completely dissolved by the time it leaves the nozzle 23. The use of a solid dentifrice or medicament which merely disperses but does not completely dissolve in the liquid flowing through tube 14 is not recommended since due to the force or velocity of the stream issuing from the nozzle 23, solid particles, if present in the stream, are liable to cause injury to the teeth and gums. Many liquid dentifrices are known and can be used. An example of a known liquid dentifrice is a mixture of stannous fluoride, zinc chloride, a buffering agent such as sodium bicarbonate and a flavoring agent such as peppermint, spearmint or the like.

A suitable liquid medicament for treating the gums is disclosed in Patent No. 2,430,450 and comprises carbamide (urea) peroxide, anhydrous glycerol and artificial flavoring. An oxidizing agent, such as hydrogen peroxide, is sometimes used for treating the oral cavity and may be introduced into container 18.

The specific dentifrice or medicament used is not part of this invention, and any known dentifrice or medicament which is a liquid or a solid or paste which may be completely dissolved prior to its issuance from nozzle 23 may be used.

The cup 24 is of a size such that it will easily be inserted between the lips and cheek and the outside of the teeth and gums without discomfort to the user. The edge of the cup projects beyond the end of nozzle 23 so that the end of the nozzle will not contact the teeth and gums when the nozzle is inserted in the mouth, as stated above. The extent of this spacing need not be great and may be from 0 to 1½ inches, preferably ¼ of an inch. The rim of the cup may have a diameter between ¼ and ¾ of an inch.

After insertion in the mouth the head 10 and the disc 28 are manipulated to supply a stream of water containing the desired amount of dentifrice while the nozzle and cup are moved back and forth. If the cup is used, as preferred, the movement of the cup in contact with the gums will cause a massaging of the gums which will supplement the massaging action of the stream.

The user of the device will find it necessary to expectorate from time to time when the mouth becomes filled with the liquid. This he can do after removing the finger or palm of his hand from the head 10 of stem 7 to cut off the flow of water.

The modification shown in FIG. 2 differs from that shown in FIG. 1 only in the manner in which the material from container 18 is introduced into the stream flowing to nozzle 23. No piston is used in container 18, and no opening 15 is provided in tube 14a in FIG. 2. Instead, the constriction 17a of tube 14a is made asymmetric, as shown, and at least two substantially diametrically opposed openings 16a are provided in the asymmetrically constricted portion 17a. The asymmetric flow of the liquid through the constricted portion 17a will cause a pressure difference between the diametrically opposed openings 16a, causing a portion of the liquid to enter the container and mix with the material therein through one of the diametrically opposed openings, and, simultaneously, the mixture within the container will be aspirated by the stream flowing through the portion 17a and exit from the container through the other of the diametrically opposed openings and mix with the stream flowing to the nozzle 23. Valve 25 will control the flow of liquid to and from container 18. The construction and operation of the device shown in FIG. 2 is otherwise the same as that shown in FIG. 1.

FIG. 3 shows a further modification of the novel device in which a removable container 18b is used. In this modification the flexible tubing or hose 1 is connected directly to tube 14b by coupling 3b. The container 18b is removably attached to tube 14b.

The container 18b comprises a chamber 32 formed by a rigid wall or walls open at one end and closed at the other. A separate cover 33 is provided for closing the open end of the chamber and is secured to the chamber by a flange 33a threaded to the chamber wall. The cover 33 has a screw threaded projection 34 extending therefrom. The tube 14b is provided with a projection 35 which is in alignment with projection 34, and the two projections are secured together by coupling 31. A passageway 36 extends through both projections and establishes communication between the interior of chamber 32 and the bore of tube 14b. The flow of liquid through passageway 36 is controlled by valve 37, rigid with a valve stem 38 positioned within a hollow projection 39 extending from tube 14b diametrically opposite from projection 35. The projection 39 is closed by a plug 40 through which valve stem 38 extends, the plug thereby serving as a guide for the valve stem. The valve stem 38 is provided with a flange 41 positioned within hollow projection 39. A spring 42 is interposed between plug 40 and flange 41 to urge valve 37 to the closed position to cut off communication between passageway 36 and the bore of tube 14b. The end of the valve stem 38 beyond plug 40 is provided with a lever 43 which may be actuated to open the valve 37 against the force of spring 42.

The side wall of the chamber 32 is provided with a tubular projection 44 having a passageway 45 therethrough communicating with the interior of the container. The free end of projection 44 slidably fits into a projection 46, extending from tube 14b at a point adjacent to coupling 3b and upstream of projection 35. The projection 46 is provided with a passageway 47 in register with passageway 45 thereby establishing communication between the bore of tube 14b and the interior of the chamber 32.

A flexible bag of rubber or other plastic material 48 is positioned within the chamber 32 with the open end of the bag clamped between the edge of the chamber wall and the cover 33. The bag is adapted to contain the material used for cleaning or treating the teeth. As may be seen by viewing FIG. 3, the passageway 36 in projection 34 communicates with the interior of the bag whereas passageway 45 in projection 44 communicates with the chamber 32 exteriorly of the bag 48.

A valve 2 of substantially the same construction as valve 2 shown in FIG. 1 is threadably secured at one end to the end of tube 14b downstream of the projections 35 and 39. The tube 20 is secured to the other end of the valve and the bore 5 establishes communication between the tubes 14b and 20 upon actuation of valve stem 7 in the manner already described in connection with FIG. 1. The valve 2 is positioned in spaced relation to projections 35 and 39 but sufficiently close so that by grasping the portion of tube 14b between the projections and valve with the fingers, both lever 43 and head 10 of stem 7 may be operated with the palm and fingers of the same hand.

In operating the device shown in FIG. 3, after connecting the flexible pipe 1 to a source of water under pressure, the tube 14b is grasped with the fingers in the space between projections 34 and 35 and valve 2, and lever 43 and head 10 are depressed with the palm of the same hand. Water then flows from flexible tube 1 through tube 14b through passage 5 in valve 2, through tube 20 and out through nozzle 23. A portion of the water is by-passed through passageway 45 into chamber 32 and the pressure of the water in the chamber causes the material in the bag to be forced through passageway 36 and into the main stream flowing through tube 14b and there mix with the water in the main stream and flow through the passageway 5 and tube 20 and out through the nozzle 23. The bore of the tube 14b in the vicinity of the valve 37 is constricted at 49 to produce an aspirating effect on the liquid in passageway 36 when the valve is open.

The advantage of the construction shown in FIG. 3 is that the cleansing or medicament material may be prepackaged in a container 18b as shown in this figure, and the entire container may be removed from the device at coupling 31 and replaced with another container containing desired material. However, it is not necessary to prepackage the material in a container such as container 18b, but it may be sufficient to prepackage the material in a flexible bag such as bag 48 and replace the bag 48 with a new bag containing the desired material utilizing the same chamber 32 and cover 33. This may be accomplished by removing chamber 32 by unscrewing coupling 33a.

The operation of this modification is the same as that of the device shown in FIG. 1.

This invention is to be distinguished from the practice of some dentists when grinding a tooth, of introducing water into the mouth of the patient for the purpose of cooling the tooth and to remove the debris. The hose used by the dentist for the introduction of the water into the patient's mouth is attached to and forms a part of the grinding machine. There is no means for introducing a dentifrice or medicament into the water and the water is introduced into the mouth at such low velocity that the water is incapable of dislodging food particles or massaging the gums. The patient must swish the water in his mouth, after it is introduced, in order to carry away the debris from the grinding of the tooth.

The device of this invention, on the other hand, is a self-contained unit which may be carried from place to place. It is provided with means for introducing a dentifrice or medicament into the stream of water. The liquid is introduced into the mouth by the user himself in a stream of a size and at a velocity sufficient to penetrate the spaces between the teeth to dislodge food particles and to massage the gums. No swishing is necessary.

The device and process for cleaning teeth described above overcomes the many disadvantages resulting from the use of the toothbrush already mentioned. Applicants' device is easy and convenient to use. It cleans the teeth and massages the gums more thoroughly than does the toothbrush and without injury to the gums and teeth.

Connecting the hose 1 to an ordinary household faucet is the most convenient way of causing water to flow through the device. This, however, is not the only way of supplying the water. The hose may be connected directly to a water pipe or even directly to the outlet of a water pump or to a tank containing liquid under pressure, provided the pressure in the pipe, pump, or tank is sufficient to produce a solid stream of liquid issuing from the nozzle 23 at a velocity sufficiently great to dislodge particles of food from between the teeth and to cause a massaging of the gums.

While a detailed description of the novel process and device has been given, this description is given by way of illustration and not by way of limitation. Modifications may be resorted to within the scope of the appended claims.

We claim:
1. A dental hygiene device comprising a valve, means for supplying liquid to said valve, a rigid pipe leading from said valve, a container mounted on said pipe and surrounding a portion of the pipe, longitudinally spaced openings in said pipe for establishing communication between the interior of the container and the interior of the pipe, a piston within the container mounted on the pipe for sliding movement between said openings, a valve for one of said openings, the outer end of the pipe extending beyond the container and being curved, a nozzle having an orifice capable of forming a solid stream of liquid rigidly mounted on the curved end of the pipe and a cup shaped element of resilient material mounted on the end of the nozzle and extending therebeyond in surrounding relation to the stream issuing therefrom, the inside diameter of the element being larger than the orifice, whereby a portion of the liquid flowing through the pipe is diverted through one of the openings and flows into the container to actuate the piston thereby forcing the contents of the container through the other opening and into the pipe where it mixes with the remainder of the liquid flowing through the pipe and the mixture issues as a solid stream through the nozzle and flows through the cup shaped element out of contact with the walls thereof.

2. A dental hygiene device for delivering a liquid stream to the teeth to clean the teeth and massage the gums, said device comprising:
 a spring-biased valve;
 means for supplying liquid to said spring-biased valve;
 a rigid pipe rigidly connected to said spring-biased valve;
 a container rigidly mounted on said pipe, the outer end of said rigid pipe extending beyond said container and being curved;
 two spaced openings in said pipe for establishing communication between the interior of said container and the interior of said pipe, whereby a portion of the liquid flowing through the pipe is diverted through one of said spaced openings and flows into the container and exerts pressure on the contents of the container;
 means associated with the other of said spaced openings for effecting a movement of material while under said pressure from said container into said pipe to mix with the liquid flowing through said pipe;
 a separate valve for said other of said spaced openings;
 a nozzle rigidly detachably mounted on the curved end of said rigid pipe, said nozzle having an orifice of a diameter capable of forming a solid stream of liquid of small cross section;
 a cup-shaped element of soft resilient material mounted on the end of said nozzle and extending therebeyond sufficiently to prevent contact of said nozzle with the teeth when said cup-shaped element is placed against the teeth, said cup-shaped element being in surrounding relation to the stream of liquid issuing from said nozzle, the inside diameter of said cup-shaped element being larger than said orifice and stream;
 and means to simultaneously and independently control with one hand both the velocity of the solid stream issuing from the nozzle and the amount of material entering the pipe from the container so that the amount of material in the stream may be varied without affecting the velocity of the stream, said control means including a pair of separate valve actuators, one for each of said spring biased valve and said separate valve, said valve actuators being constructed and positioned sufficiently close to each other to enable an operator to actuate both of said valves simultaneously but independently with one hand;
 whereby the pipe may be grasped with one hand and the two valves may be simultaneously but individually controlled with the same hand by the operator during the flow of liquid from the nozzle to determine the velocity of the stream issuing from the nozzle independently of the amount of material entering the pipe from the container and to vary the amount of material entering the pipe from the container independently of the velocity of the stream issuing from the nozzle and while the cup-shaped element is being moved in contact with the teeth with the same hand.

3. A dental hygiene device as recited in claim 2 wherein the container is in surrounding relation to said pipe and said separate valve is a rotary sleeve valve.

4. A dental hygiene device as recited in claim 2 wherein said container is provided with a flexible bag on the interior thereof, the said one of said spaced openings communicates with the container outside of said bag, said other of said openings communicates with the interior of said flexible bag and said separate valve is a spring-biased valve.

References Cited by the Examiner

UNITED STATES PATENTS

| | | | |
|---|---|---|---|
| 1,147,667 | 7/1915 | Albright | 15—526 |
| 1,278,225 | 9/1918 | Schamberg. | |
| 1,466,474 | 8/1923 | Hatcher et al. | 128—229 |
| 1,646,942 | 10/1927 | Tuorto | 128—229 |
| 1,848,621 | 3/1932 | Gollwitzer | 128—224 |
| 1,868,893 | 7/1932 | Gentle | 128—66 XR |
| 2,323,618 | 7/1943 | Ottoson | 137—564.5 |
| 2,487,694 | 11/1949 | Capell | 128—229 |
| 2,571,424 | 10/1951 | Dailey | 15—526 XR |
| 2,620,234 | 12/1952 | Schaich | 137—564.5 |
| 2,781,154 | 2/1957 | Meredith | 128—66 XR |
| 2,957,476 | 10/1960 | Freeman | 128—229 |

FOREIGN PATENTS 87,613   7/1959   Denmark.

RICHARD A. GAUDET, *Primary Examiner.*